(12) United States Patent
Parker et al.

(10) Patent No.: US 7,809,762 B1
(45) Date of Patent: Oct. 5, 2010

(54) OUTAGE-LESS DATABASE CHANGE OPERATION

(75) Inventors: Christopher F. Parker, Round Rock, TX (US); Donald W. Black, Round Rock, TX (US); Mary D. Black, legal representative, Round Rock, TX (US)

(73) Assignee: BMC Software, Inc., Houston, TX (US)

( * ) Notice: Subject to any disclaimer, the term of this patent is extended or adjusted under 35 U.S.C. 154(b) by 1868 days.

(21) Appl. No.: 10/618,208

(22) Filed: Jul. 11, 2003

(51) Int. Cl.
*G06F 7/00* (2006.01)

(52) U.S. Cl. ...................................... 707/802

(58) Field of Classification Search ............ 707/1, 707/104.1, 200, 10, 102, 100, 3, 999.102, 707/999.103
See application file for complete search history.

(56) References Cited

U.S. PATENT DOCUMENTS

| | | | |
|---|---|---|---|
| 5,396,623 A * | 3/1995 | McCall et al. .............. 707/101 |
| 5,491,818 A * | 2/1996 | Malatesta et al. .................. 1/1 |
| 5,546,536 A * | 8/1996 | Davis et al. .................... 714/20 |
| 5,613,111 A * | 3/1997 | Malatesta et al. .................. 1/1 |
| 6,035,379 A * | 3/2000 | Raju et al. ................... 711/162 |
| 6,070,170 A * | 5/2000 | Friske et al. ................ 707/202 |
| 6,192,460 B1 * | 2/2001 | Goleman et al. ............... 712/1 |
| 6,965,905 B2 * | 11/2005 | Garthwaite ........................ 1/1 |
| 2003/0009436 A1 * | 1/2003 | Broden et al. .................. 707/1 |
| 2003/0135478 A1 * | 7/2003 | Marshall et al. ................ 707/1 |
| 2003/0220938 A1 * | 11/2003 | Norcott ................... 707/104.1 |

* cited by examiner

*Primary Examiner*—Hosain T Alam
*Assistant Examiner*—Eliyah S Harper
(74) *Attorney, Agent, or Firm*—Wong, Cabello, Lutsch, Rutherford & Brucculeri, L.L.P.

(57) ABSTRACT

Techniques to update/change a database without incurring a user outage include receiving a user-specified change command which is then evaluated to determine which portion(s) of the target database will change as a result of the command. Shadow copies of those portions are then created and updated in accordance with the change command. The change command is next applied against the target database and any portion(s) placed in a restricted status because of this action are reset to an un-restricted state. The updated shadow portion(s) are then swapped for the corresponding portion(s) of the target database.

38 Claims, 5 Drawing Sheets

OUTAGE-LESS DATABASE CHANGE OPERATION

BACKGROUND

The present invention relates to updating a database and more particularly, but not by way of limitation, to a system and methods for updating the structure of a database without restricting a user's access to the database during the update operation.

Databases may be characterized as comprising two types of "objects"—data objects and index objects, both of which are typically embodied as files stored on one or more direct access storage devices (DASD). Data objects and index objects are, in turn, organized and managed through a system catalog or data dictionary (also embodied as files stored on one or more DASD). A system catalog's function is to describe the objects in its database. For example, a system catalog identifies the structure (schema) of each table in its database and any indices associated with those tables. For ease of discussion the following disclosure uses the term 'table' to refer to data objects, the term 'index' to refer to index objects and the term 'catalog' to refer to a database's system catalog.

Referring to FIG. 1, a typical prior art database change operation 100 is shown. To start, a user-initiated database change command is received (block 105). Illustrative change commands include those commands directed to inserting a new database table entry, updating an existing database table entry, creating an index and updating or rebalancing an existing index. Once received, the change command is executed (block 110) and committed (block 115). As one of ordinary skill in the art would recognize, the commit operation makes permanent the database changes made during the acts of block 110. Next, the update process contemplated by the change command of block 105 and enabled by the acts of blocks 110 and 115 is performed (block 120). In some database change operations, either the entire database or that portion of the database being updated is restricted from user access (block 125). Once access is blocked, the database (e.g., tables and/or indices) are updated in accordance with the change command (block 130). Following completion of the update process, user access is restored (block 135) and normal operations against the updated database may continue (block 140). It is important to note that user access to at least a portion of the database being updated is blocked during the acts of block 120—often referred to as an "outage."

By way of example, consider index rebalance operation 200 outlined in FIG. 2. In this illustrative prior art database change operation, the user wishes to rebalance a partitioned database by changing the key range (sometimes referred to as the Limitkey value) associated with one or more partitions of the target database. One illustrative database which allows this type of change operation is the DB2® database. (DB2 is a registered trademark of the International Business Machines corporation of Armonk, N.Y.) After receiving the user's ALTER command (block 105), where ALTER is the DB2 command to effect the desired change in Limitkey values, rebalance process 200 locks the target database (block 205) so that subsequent user queries and/or commands are queued for later execution. The catalog for the target database is then updated to reflect the desired Limitkey changes (block 210), the partitions that must be updated to effect the desired changes are set to a restricted state (block 215) and the lock set during the acts of block 205 is released (block 220). The catalog changes made during the acts of block 210 and the restricted status of one or more of the database's partitions are made permanent when committed (block 115).

Next, rebalance process 200 issues a STOP command against the target dataset, or at least those partitions of the target database placed into a restricted state in accordance with block 215 (block 225). Until the restricted status is removed and a start command is issued (see block 240 below), those partitions placed into a restricted state are not accessible to users and any queries and/or commands that require the restricted partitions are failed. Accordingly, a user outage begins once the change command is committed. Those partitions (tables and indices) needing modifications to effect the desired rebalance operation are made (block 230), the restricted state of the modified partitions is released (block 235) and the database restarted (240). Once restarted, user access is restored (i.e., the blockage ends) and normal user queries and/or commands may be processed.

As noted above, some database changes, such as the index rebalance operation of FIG. 2, cause an outage during which user access to at least a portion of a target database is not possible. To mitigate some of the problems attendant with an outage, database administrators typically schedule such operations for early in the day and/or weekends when the number of expected users is low. However, as the economy evolves into a 24-hours a day operation, an outage at any time of the day can have serious and negative business consequences. Thus, it would be beneficial to provide techniques (methods and devices) to effect structural database changes that do not create or cause a user outage.

SUMMARY

In one embodiment, the invention provides a method to change the structure (tables and/or indices) of a target database without causing user outages. The method includes receiving a database change command, determining one or more portions of the target database that will be affected by the change command, creating one or more shadow portions of the determined one or more portions, changing the one or more shadow portions in accordance with the change command, executing the change command against the target database and swapping the one or more shadow portions for the determined one or more portions. Methods in accordance with the invention create and change the shadow portions before executing the change command. Methods in accordance with the invention may be stored in any media that is readable and executable by a computer system.

DETAILED DESCRIPTION

The present invention relates to updating a database and more particularly, but not by way of limitation, to a system and methods for updating the structure of a database without restricting a user's access to the database during the update operation. The following embodiments are described in terms of rebalancing a partitioned DB2® database by specifying a change in Limitkey values through the DB2 ALTER (change) command. These embodiments are illustrative only and are not to be considered limiting in any respect.

Figure 1:
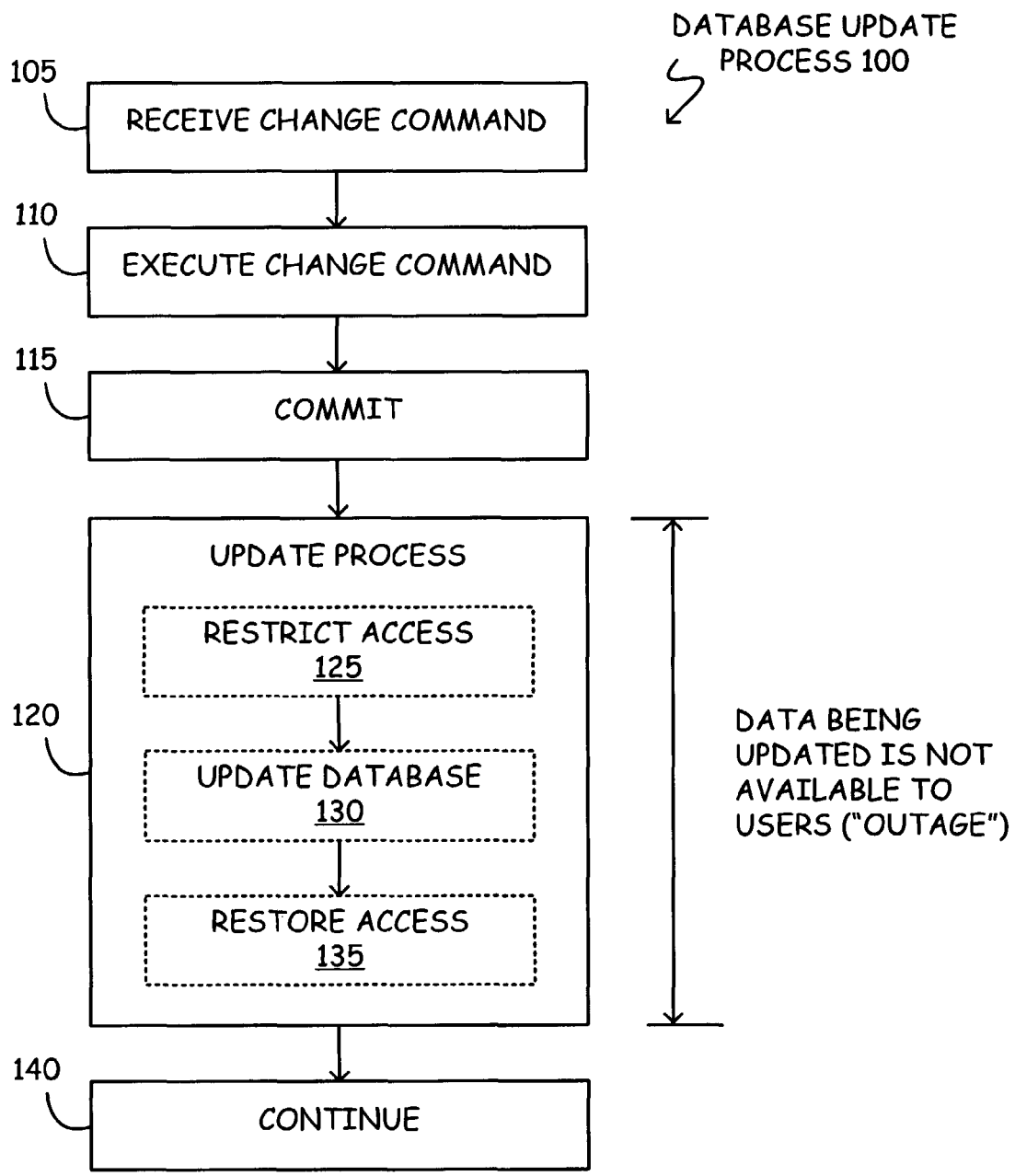
FIG. 1 shows, in flowchart form, a prior art database change operation.
Figure 2:
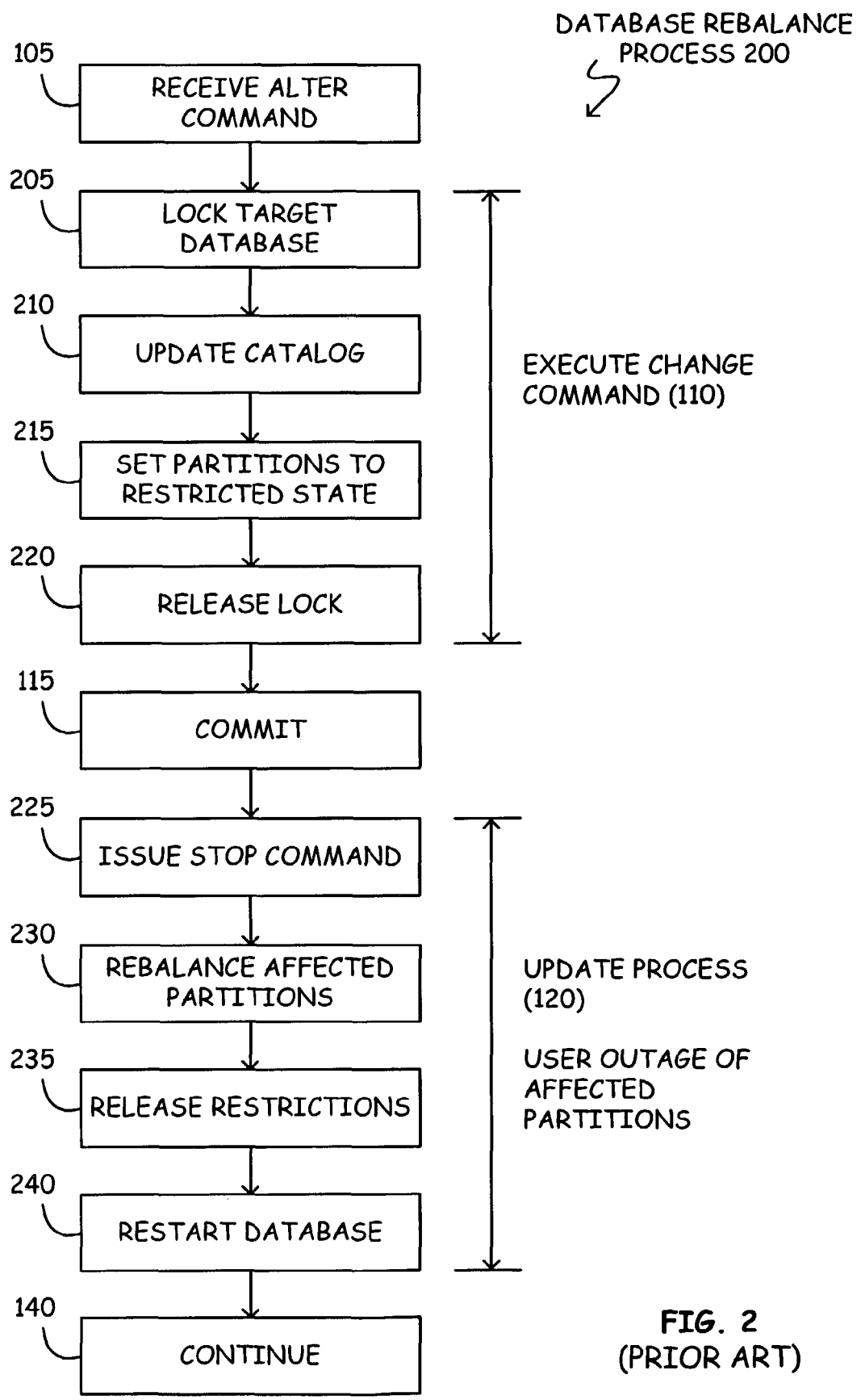
FIG. 2 shows, in flowchart form, a prior art database rebalance operation.
Figure 3:
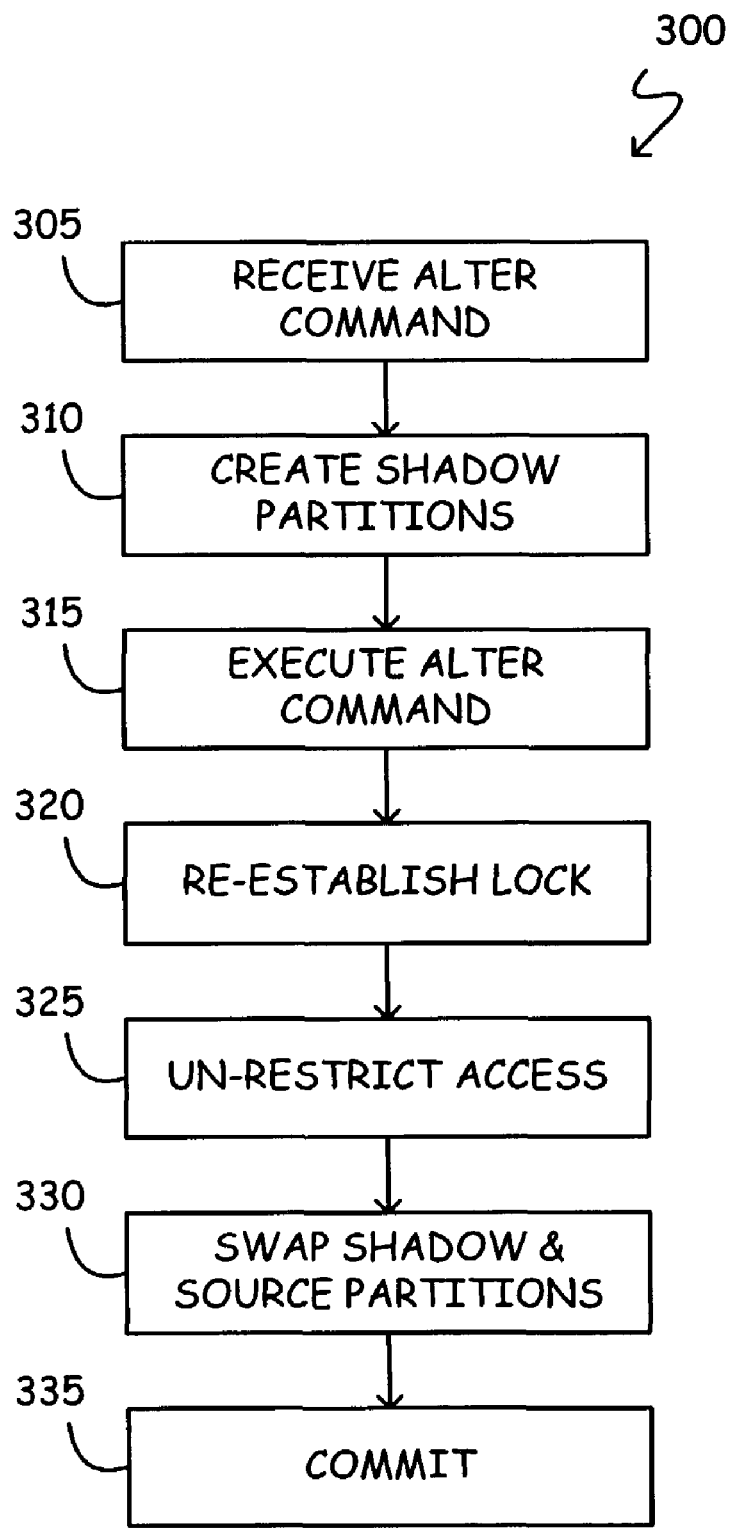
FIG. 3 shows, in flowchart form, a database update process in accordance with one embodiment of the invention.

Referring to FIG. 3, database structure update process 300 in accordance with one embodiment of the invention begins when an ALTER command is received (block 305). Next, a shadow copy of the partitions (tables and indices) needed to effect the ALTER is created (block 310). The ALTER command is then executed as in the prior art (block 315). That is, the database whose structure is being updated (hereinafter, the "source" database) is locked, its catalog is modified in accordance with the ALTER command, the portions/partitions of the database needing change are placed in a restricted state and the aforementioned lock is released (see FIG. 2 at block 205-220). As known in the art, a DB2 database partition is placed into a restricted state by setting its REORP status to ON or TRUE.

Update process 300 then re-establishes the lock released during the acts of block 315 (block 320) and sets those partitions of the database placed into a restricted state by the acts of block 315 into an unrestricted state (block 325). The previously updated shadow partitions are then swapped for their associated (but not updated) partitions in the source database (block 330) and the aforementioned acts committed (block 335). Performing the COMMIT has the effect of releasing the lock re-established during the acts of block 320 so that any queued user queries and/or commands against the previously locked partitions can be processed.

It is significant that illustrative update process 300 in accordance with the invention actually obtains and updates the structure of source database partitions in block 310, before the change command is ever executed against the source database in block 315. It is further significant that update process 300 keeps the source database (or portions thereof) out of a restricted state (see block 325). A consequence of these unique features is that a database's structure may be updated without causing a user outage. (It will be recognized and appreciated by those of ordinary skill in the art that use of database locks cause user queries and/or commands to queue so that users do not perceive an outage, while use of restrictive states cause user queries and/or commands to fail which, by definition, is perceived as an outage.)

Figure 4:
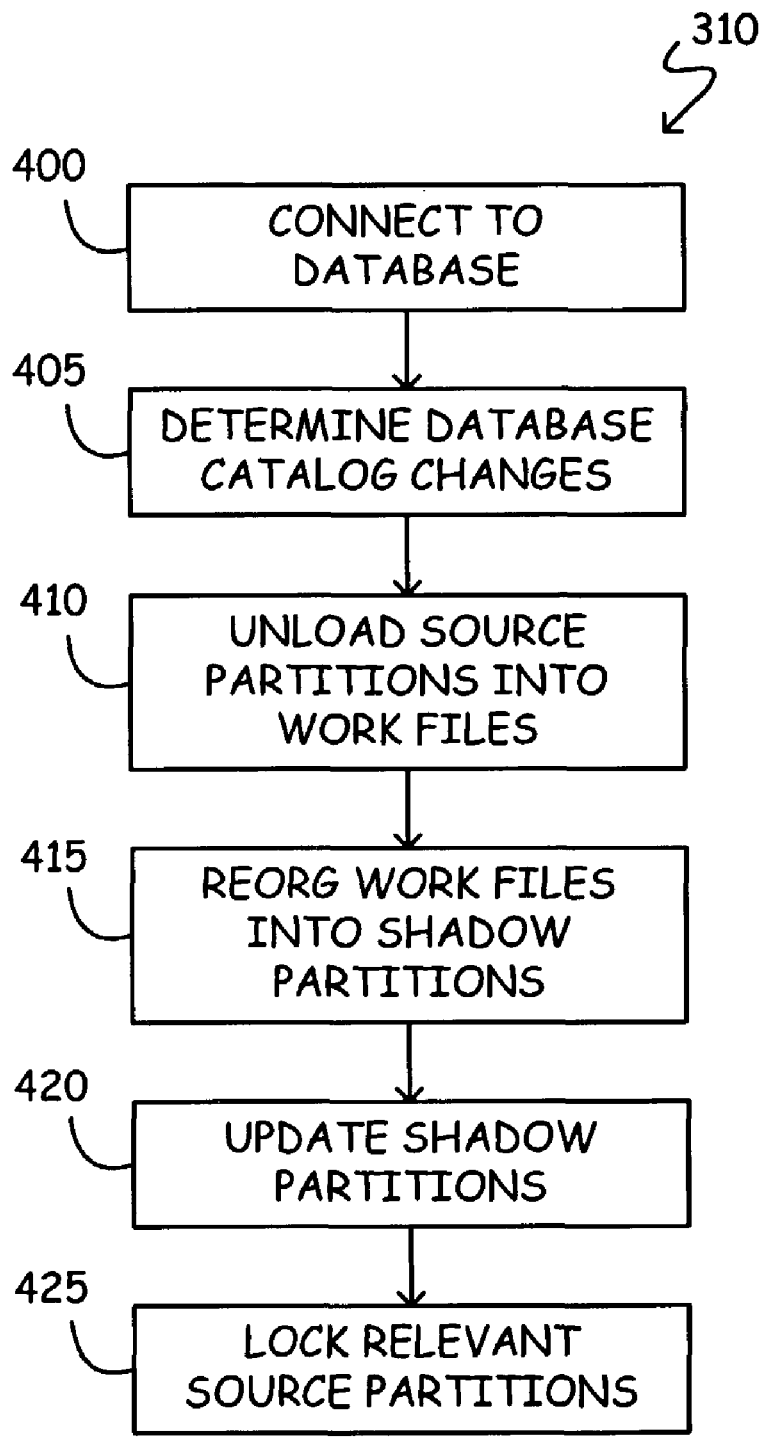
FIG. 4 shows, in flowchart form, a shadow data operation in accordance with the embodiment of FIG. 3.

Referring now to FIG. 4, a detailed view of the acts of block 310 is provided. Initially, update process 300 establishes a connection with the source database (block 400) and the ALTER command is analyzed to determine which source database partitions need to be modified/changed to effect the ALTER command (block 405). Next, those partitions identified as needing to be changed in block 405 are unloaded (i.e., copied) into one or more work files (block 410) and reorganized in accordance with the ALTER command into one or more shadow partitions (block 415). Following the initial reorganization of block 415, the shadow partitions may be updated (as needed) to incorporate any changes that occurred in the source database during the acts of blocks 400-415 (block 420). Typically, shadow partitions can be updated by interrogating the source database's log file(s) for any (committed) changes made during the aforementioned time and which would affect the content of one or more of the shadow partitions. One of ordinary skill in the art will recognize that to effect the changes contemplated by block 420, it is necessary to maintain a mapping between each entry (i.e., row) in the shadow partition(s) and that entry's location in the source database. Once the shadow partitions have been updated to reflect the current state of their associated source partitions, the source partitions (identified in block 405) are locked (block 425).

Continuing the example above, the acts of block 425 involve executing of a pair of DB2 programs for each contiguous group of partitions that were identified during the acts of block 405 as needing to be changed, updated or altered. That is, if the ALTER command of block 305 (see FIG. 3) is determined is to require structural changes to table partitions 1-4 and 9-18 and index partitions 1-4 and 9-18, the aforementioned pair of DB2 programs would be called four times: one time for table partitions 1-4; one time for table partitions 9-18; one time for index partitions 1-4; and one time for index partitions 9-18.

Figure 5:
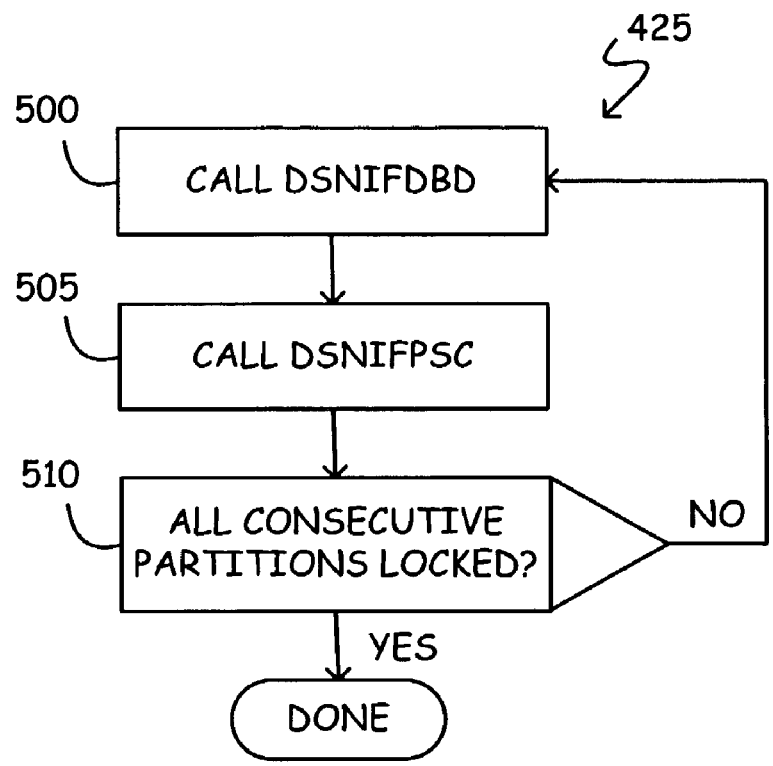
FIG. 5 shows, in flowchart form, a method to establish or reestablish a database lock in accordance with one embodiment of the invention.

Referring to FIG. 5, DB2 program DSNIFDBD is called (block 500) followed by DB2 program DSNIFPSC (block 505). If all contiguous partition groups have been processed (the 'YES" prong of block 510), then all relevant source partitions have been locked (i.e., have had their drain set). If additional partitions need to be locked (the 'NO" prong of block 510), processing continues at block 500. The parameter list format for the DSNIFDBD program is shown in Table 1. The DSNIFPSC program takes a single parameter (a 4-byte address) that points to a contiguous block of memory having the values identified in Table 2.

TABLE 1

DSNIFDBD Parameter List

| Parameter | Comment |
|---|---|
| 4-byte pointer to source database's DBID concatenated with a hex 1 value, x'01' | DBID is the DB2 internal identifier associated with each database. |
| 4-byte pointer to a location in which the DSNIFDBD program returns the address of the source database's DBD | DBD is the DB2 internal structure containing information describing certain database characteristics. |
| 4-byte pointer to the hex constant x'00 00 00 00 04 40 00 00' | |
| 4-bytes of zero | x'00 00 00 00' |

TABLE 2

DSNIFPSC Values

| Value | Comment |
|---|---|
| 2-byte DBID concatenated with the hex value x'01 00' | See discussion in Table 1. |
| 2-byte PSID or ISOBID | PSID is the DB2 internal Page Set Identifier, ISOBID is the DB2 internal Index Set Object Set Identifier. If a table object is being locked, a PSID value is used. If an index object is being locked, an ISOBID value is used. |
| 26-bytes of zero | x'00 00 00 00 00 00 00 00 00 00 00 00 00 00 00 00 00 00 00 00 00 00 00 00 00 00' |
| 4-byte pointer to [A] | See below. |
| 4-byte pointer to [C] | See below. |
| 2-byte partition identifier | The first partition in a contiguous group of partitions. |
| 2-byte partition identifier | The last partition in a contiguous group of partitions. |

TABLE 2-continued

DSNIFPSC Values

| Value | Comment |
| --- | --- |
| Hex constant | x'00 00 80 83 98 E8 01' |
| 3-bytes of zero | x'00 00 00' |
| 4-bytes of zero | This is entry [A]: x'00 00 00 00' |
| 4-bytes of zero | x'00 00 00 00' |
| 4-bytes of zero | This is entry [C]: x'00 00 00 00' |

It is noted that in the illustrative DB2 embodiment described above, the act of re-establishing a lock of designated source database partitions (see block 320 in FIG. 3) may be performed in the manner described above with respect to the acts of block 425. That is, the act of locking relevant source database partitions (block 425) and the act of re-establishing a lock on the same partitions can be the same.

Referring again to FIG. 3, the acts of block 325 involve executing the DB2 DSNIDBSE program for each source database partition placed in the restricted state (i.e., a partition whose REORP status has been set to ON or TRUE) as a result of executing the ALTER command (block 315). The DSNIDBSE program takes a single 4-word parameter that, logically, consists of four, 4-byte addresses as identified in Table3.

TABLE 3

DSNIDBSE Parameter Breakdown

| Value | Comment |
| --- | --- |
| 4-byte pointer to the source database's DBET | DBET is the internal DB2 Database Exception Table that contains all of the flags associated with source database objects. These flags include the REORP restriction flags. |
| 4-byte pointer to a contiguous 5-byte memory area | The first 2-bytes are the source database's DBID (see discussion in Table 1); the second 2-bytes are the PSID or ISOBID (see discussion in Table 2); and the last byte is the partition number whose restriction status is being reset. |
| 4-byte pointer to a hex constant | x'00 00 00 00 00 01 00 00' |
| 4-byte pointer to a hex constant | x'00 00 00 00' |

Figure 6:
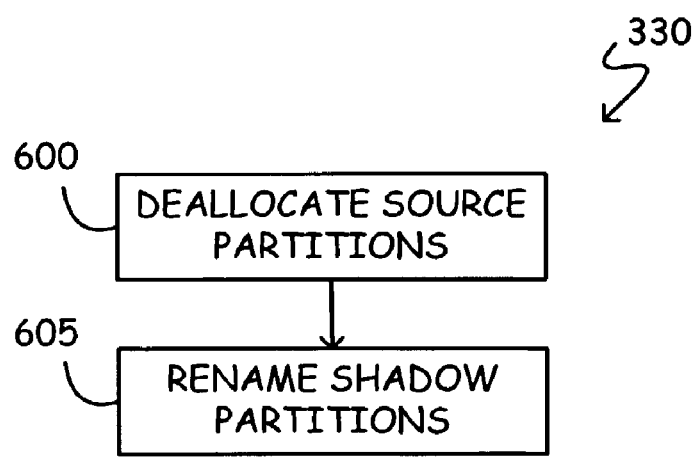
FIG. 6 shows, in flowchart form, a method to swap shadow portions of a source database for corresponding actual portions of the source database in accordance with the embodiment of FIG. 3.

Referring now to FIG. 6, a detailed view of the acts of block 330 is provided. Before the altered shadow partitions are actually incorporated into the source database, the source database partitions being replaced (by the shadow partitions) have their memory deallocated (block 600). Once deallocated, the shadow partitions are renamed to the just deallocated partitions (block 605). In the on-going partitioned database example, one means of deallocating source partitions is through the DSNICLOS program. The DSNICLOS program takes a single parameter (a 4-byte address) that points to a 4-byte pointer to a contiguous block of memory having the values identified in Table4.

TABLE 4

DSNICLOS Parameter Breakdown

| Value | Comment |
| --- | --- |
| 2-byte DBID | See discussion in Table 1. |
| 2-byte hex constant | x'01 00' |

TABLE 4-continued

DSNICLOS Parameter Breakdown

| Value | Comment |
| --- | --- |
| 2-byte PSID or ISOBID | See discussion in Table 2. |
| 1-byte partition number | |
| 1-byte hex constant | x'EB' |

Methods in accordance with the invention provide a means to change the structure of a database (or portion thereof) without causing a user outage. This beneficial result is achieved by creating shadow copies of a specified portion of a source database's information (e.g., tables and indices), maintaining locks (as opposed to restrictive states) on those portions and then swapping the structurally changed shadow portions for their corresponding source database portions. The use of shadow copies and locks in the manner described herein permit methods in accordance with the invention to avoid the use of restricted states that, by definition, create user outages.

Acts in accordance with FIGS. 3-6 may be performed by a programmable control device executing instructions organized into a program module. A programmable control device may be a single computer processor, a plurality of computer processors coupled by a communications link, or a custom designed state machine. Storage devices suitable for tangibly embodying program instructions include, but not limited to: magnetic disks (fixed, floppy, and removable) and tape; optical media such as CD-ROM disks; and semiconductor memory devices such as Electrically Programmable Read-Only Memory (EPROM), Electrically Erasable Programmable Read-Only Memory (5PROM), Programmable Gate Arrays and flash devices.

While the invention has been disclosed with respect to a limited number of embodiments directed to a DB2 ALTER command, numerous modifications and variations will be appreciated by those skilled in the art. It is intended, therefore, that the following claims cover all such modifications and variations that may fall within the true sprit and scope of the invention.

What is claimed is:

1. A database update method, comprising:
  receiving a database change command to alter the structure of a target database;
  determining one or more portions of the target database that will be affected by the change command;
  creating one or more shadow portions of the determined one or more portions;
  changing the one or more shadow portions in accordance with the change command;
  executing the change command against the target database; and
  swapping the one or more shadow portions for the determined one or more portions,
  wherein the act of creating and changing occur before the act of executing and further wherein said database update method does not cause a user outage.

2. The method of claim 1, wherein the target database comprises a DB2 partitioned database.

3. The method of claim 2, wherein the database change command comprises an ALTER command.

4. The method of claim 2, wherein the determined one or more portions comprise one or more partitions.

5. The method of claim 1, wherein the act of creating comprises unloading the determined one or more portions into work files.

6. The method of claim 5, wherein the act of updating comprises updating the work files in accordance with the change command into one or more shadow portions.

7. The method of claim 1, wherein the act of updating further comprises updating the one or more shadow portions to incorporate data content changes in the target database occurring since said act of receiving and before said act of executing.

8. The method of claim 7, wherein target database log files are used to drive said act of updating the one or more shadow portions to incorporate data content changes in the target database occurring since said act of receiving and before said act of executing.

9. The method of claim 1, further comprising establishing a lock on the target database after said act of executing and before said act of swapping.

10. The method of claim 9, further comprising removing a restricted state status from at least one of the determined one or more portions resulting from the act of executing, said act of removing occurring before the act of swapping.

11. The method of claim 10, wherein the act of removing is performed after the act of establishing.

12. The method of claim 1 further comprising committing the change command, said act of committing to be performed before the act of swapping.

13. A program storage device, readable by a programmable control device, comprising instructions stored on the program storage device for causing the programmable control device to:
receive a database change command to alter the structure of a target database;
determine one or more portions of the target database that will be affected by the change command;
create one or more shadow portions of the determined one or more portions;
change the one or more shadow portions in accordance with the change command;
execute the change command against the target database; and
swap the one or more shadow portions for the determined one or more portions,
wherein the instructions to create and change are performed before the instructions to execute and further wherein said instructions to receive, determine, create, change, execute and swap do not cause a user outage.

14. The program storage device of claim 13, wherein the target database comprises a DB2 partitioned database.

15. The program storage device of claim 14, wherein the database change command comprises an ALTER command.

16. The program storage device of claim 14, wherein the instructions to determine one or more portions comprise instructions to determine one or more partitions.

17. The program storage device of claim 13, wherein the instructions to create comprise instructions to unload the determined one or more portions into work files.

18. The program storage device of claim 17, wherein the instructions to change comprise instructions to change the work files in accordance with the change command into one or more shadow portions.

19. The program storage device of claim 13, wherein the instructions to update further comprise instructions to update the one or more shadow portions to incorporate data content changes in the target database occurring since performing the instructions to receive and before performing the instructions execute.

20. The program storage device of claim 19, wherein target database log files are used to drive said instructions to update the one or more shadow portions to incorporate data content changes in the target database occurring since performing the instructions to receive and before performing the instructions execute.

21. The program storage device of claim 13, further comprising instructions to establish a lock on the target database after performing said instructions to execute and before performing said instructions to swap.

22. The program storage device of claim 21, further comprising instructions to remove a restricted state status from at least one of the determined one or more portions resulting from performing the instructions to execute, said instructions to remove being performed before said instructions to swap.

23. The program storage device of claim 22, wherein the instructions to remove are performed after the instructions to establish.

24. The program storage device of claim 13 further comprising instructions to commit the change command, said instructions to commit to be performed before the instructions to swap.

25. A database system, comprising:
a storage device having stored thereon a database, said first database having a plurality of partitions; and
a computer unit operatively coupled to the storage device, the computer unit including a processor and a memory, the memory having stored thereon instructions for causing the processor to:
receive a database change command directed to changing the structure of the database,
determine one or more partitions of the database that will be affected by the change command,
create one or more shadow partitions of the determined one or more partitions,
change the one or more shadow partitions in accordance with the change command,
execute the change command against the database,
swap the one or more shadow partitions for the determined one or more partitions,
wherein the instructions to create and change are performed before the instructions to execute and further wherein said instructions to receive, determine, create, change, execute and swap do not cause a user outage to the database.

26. The database system of claim 25, wherein the database comprises a DB2 database.

27. The database system of claim 26, wherein the database change command comprises an ALTER command.

28. The database system of claim 25, wherein the instructions to create comprise instructions to:
unload the determined one or more partitions into one or more work files; and
change the work files in accordance with the change command into the one or more shadow partitions.

29. The database system of claim 25, wherein the instructions to update further comprise instructions to update the one or more shadow partitions to incorporate data content changes in the database occurring since performing the instructions to receive and before performing the instructions execute.

30. The database system of claim 29, wherein database log files are used to drive said instructions to update the one or more shadow partitions to incorporate data content changes in the database occurring since performing the instructions to receive and before performing the instructions execute.

31. The database system of claim 25, wherein the instructions further comprise instructions to establish a lock on the database after performing said instructions to execute and before performing said instructions to swap.

32. The database system of claim 31, wherein the instructions further comprise instructions to remove a restricted state status from at least one of the determined one or more partitions resulting from performing the instructions to execute, said instructions to remove being performed before said instructions to swap.

33. The database system of claim 32, wherein the instructions to remove are performed after the instructions to establish.

34. The database system of claim 25, wherein the instructions further comprise instructions to commit the change command, said instructions to commit to be performed before the instructions to swap.

35. The database system of claim 25, wherein the storage device comprises one or more direct access storage devices.

36. The database system of claim 35, wherein the one or more direct access storage devices are operatively coupled to the computer unit by a computer network.

37. The database system of claim 36, wherein the computer network comprises the Internet.

38. The database system of claim 36, wherein the computer network comprises an intranet.

* * * * *